United States Patent [19]

Garza

[11] 4,403,746

[45] Sep. 13, 1983

[54] CONTINUOUS LOOP FILM PROJECTING APPARATUS

[76] Inventor: Roberto M. Garza, P.O. Box 7036, San Antonio, Tex. 78207

[21] Appl. No.: 183,437

[22] Filed: Sep. 2, 1980

[51] Int. Cl.³ ...................... G03B 21/00; G11B 23/06
[52] U.S. Cl. ............................... 242/55.19 R; 352/128
[58] Field of Search ................. 242/55.19 R, 55.19 A, 242/179; 352/128, 126; 226/97

[56]                  References Cited
                  U.S. PATENT DOCUMENTS

| | | | |
|---|---|---|---|
| 1,713,939 | 5/1929 | Wingren | 242/55.19 R |
| 1,829,095 | 10/1931 | King et al. | 242/55.19 R |
| 1,980,600 | 11/1934 | Spoor | 352/146 |
| 2,272,413 | 2/1942 | Links et al. | 242/55.19 R |
| 2,281,328 | 4/1942 | Shapiro | 242/55.19 R |
| 2,290,447 | 7/1942 | Price | 242/55.19 R |
| 3,479,112 | 11/1969 | Lester | 352/78 |
| 3,551,039 | 12/1970 | Hewitt | 352/126 |
| 3,589,803 | 6/1971 | Bouma | 352/72 |
| 3,733,119 | 5/1973 | Catalano | 352/78 R |
| 3,770,223 | 11/1973 | Takahama | 242/55.19 A |
| 3,790,261 | 2/1974 | Threlkeld | 352/72 |
| 4,012,006 | 3/1977 | Leshik | 242/55.19 A |
| 4,208,018 | 6/1980 | Wilkinson | 242/55.19 R |

OTHER PUBLICATIONS

Complete Automated & Theatre, Optical Radiation Corp.

*Primary Examiner*—Billy S. Taylor
*Attorney, Agent, or Firm*—Gunn, Lee & Jackson

[57] ABSTRACT

A continuous loop film projecting apparatus whereby film from a projector is received on a platter having pneumatic or mechanical means to decrease the friction on the film as a result of the film rubbing against the platter surface. A blower located beneath the platter forces air through a series of holes or jets in the platter, lifting the edge of the film enough off the platter to decrease the tension on the film and help prevent the film from breaking. Instead of forcing air through holes in the platter to lift the film, the platter may have slots extending almost the width of the platter with blades attached to the bottom of the platter underneath the slots, the blades projecting through the slots as a roller on the blade contacts a camming surface. The same results are achieved with the blade/cam combination, or mechanical means, as with the forced air, or pneumatic means, namely the film is momentarily lifted off the platter thereby reducing the friction on the film and decreasing the possibilities of the film breaking or becoming damaged.

9 Claims, 12 Drawing Figures

CONTINUOUS LOOP FILM PROJECTING APPARATUS

BACKGROUND OF THE INVENTION

Automation is revolutionizing more industries in ever increasing numbers. The motion picture industry is no exception. To be able to successfully automate the projection of movies in a theater is very desirable. The invention fulfills this desire by providing an apparatus having continuous loop film projecting capability, the apparatus having such a design so as to decrease the possibilities of damage to projected film. In the invention apparatus, film received on a platter is lifted off the surface of the platter by either pneumatic or mechanical means, the lifting decreasing the tension and the stress on the film thereby reducing the changes of the film breaking or otherwise being damaged.

BRIEF DESCRIPTION OF THE PRIOR ART

Projection of a closed loop film is well-known as shown in U.S. Pat. Nos. 3,479,112; 3,551,039; 3,589,803; and 3,733,119. However, these patents are directed to projectors suitable to be used in a home, the projectors using a closed loop film enclosed in a cartridge.

Threlkeld, in U.S. Pat. No. 3,790,261, discloses a long play film cartridge and projector, the cartridge having a rotor with film supporting ridges radiating outward from a hub. The ridges and the rotor itself are designed in such a manner that the wound film near the hub of the rotor is loosely packed relative to the film near the periphery of the rotor. Such a condition allows the film to be more easily fed from the center of the rotor into the projecting means.

Another projector design is shown in Takahama, U.S. Pat. No. 3,770,223, wherein the magazine carrying an endless film is wrapped around a hub of unique configuration. Again the improved magazine allows film to be easily removed without damage to the surface of the film.

Optical Radiation Corporation of Azusa, Calif. has a continuous loop film handling system, C.A.T. (Complete Automated Theatre), wherein up to 4½ hours of 35 mm film may be received and dispensed from a single platter. The design of the system decreases friction on the film as it is fed into a projector and aids in preventing wear or film breakage.

The present invention distinguishes over the prior art systems by providing an apparatus to be used in a movie theatre, the apparatus projecting a continuous loop of film from a platter having pneumatic or mechanical means to reduce the friction on the film as it contacts the platter.

SUMMARY OF THE INVENTION

It is an object of the present invention to provide a continuous loop film projecting apparatus that reduces the friction on the film by pneumatic means. Air blown through a series of holes or jets in the platter lifts the edges of the film off the platter thereby reducing the friction between the film and the platter surface. A blower located underneath the platter connects to a bellows that directs the air to the holes or jets in the platter. Adjustable seals on the top edges of the bellows engage the underside of the platter to reduce or increase the amount of air forced through the holes or jets in the platter according to the quantity of film to be received on the platter. Alternatively, in lieu of the bellows, a reciprocating manifold may provide the passageway for air from the blower to the holes or jets in the platter.

It is another object of the present invention to provide a continuous loop film projecting apparatus that reduces the friction on the film by mechanical means. Film on a platter having a series of slots is raised off the platter surface by the projection of a blade through a slot in the platter. The blade pivotally connected to the bottom of the platter projects through the slot as a result of a roller on the blade contacting a camming surface beneath the platter. Projection of the blade through the slot in the platter lifts the edge of the film on the platter thereby reducing the friction between the film and the platter surface.

DESCRIPTION OF THE PREFERRED EMBODIMENT

Figure 1:
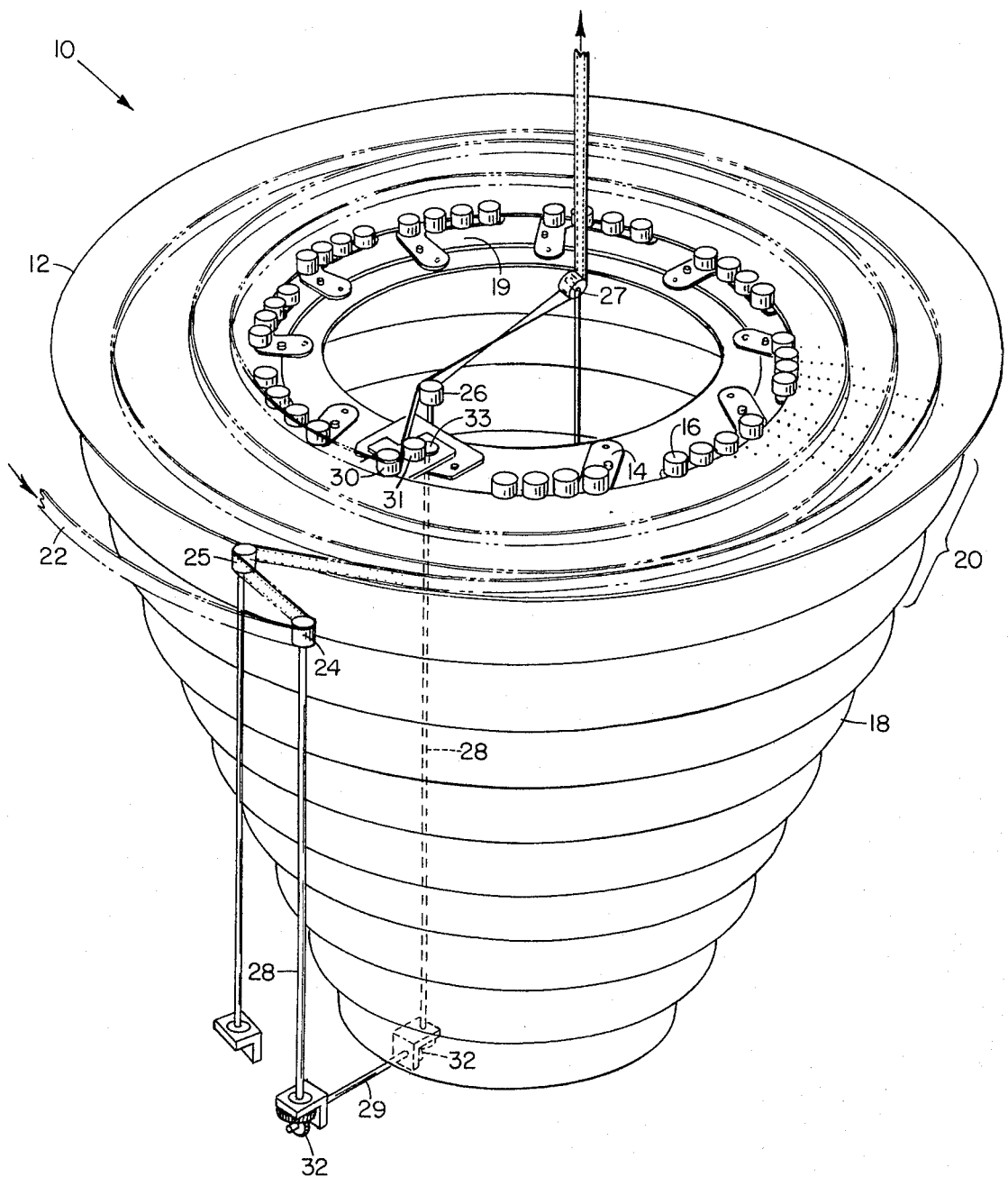
FIG. 1 is a perspective view of the invention apparatus.

For a detailed description of the invention, reference is made to the attached drawings werein the invention is illustrated. Identical reference characters will be utilized to refer to identical or equivalent components throughout the various views in the following description.

Figure 10:
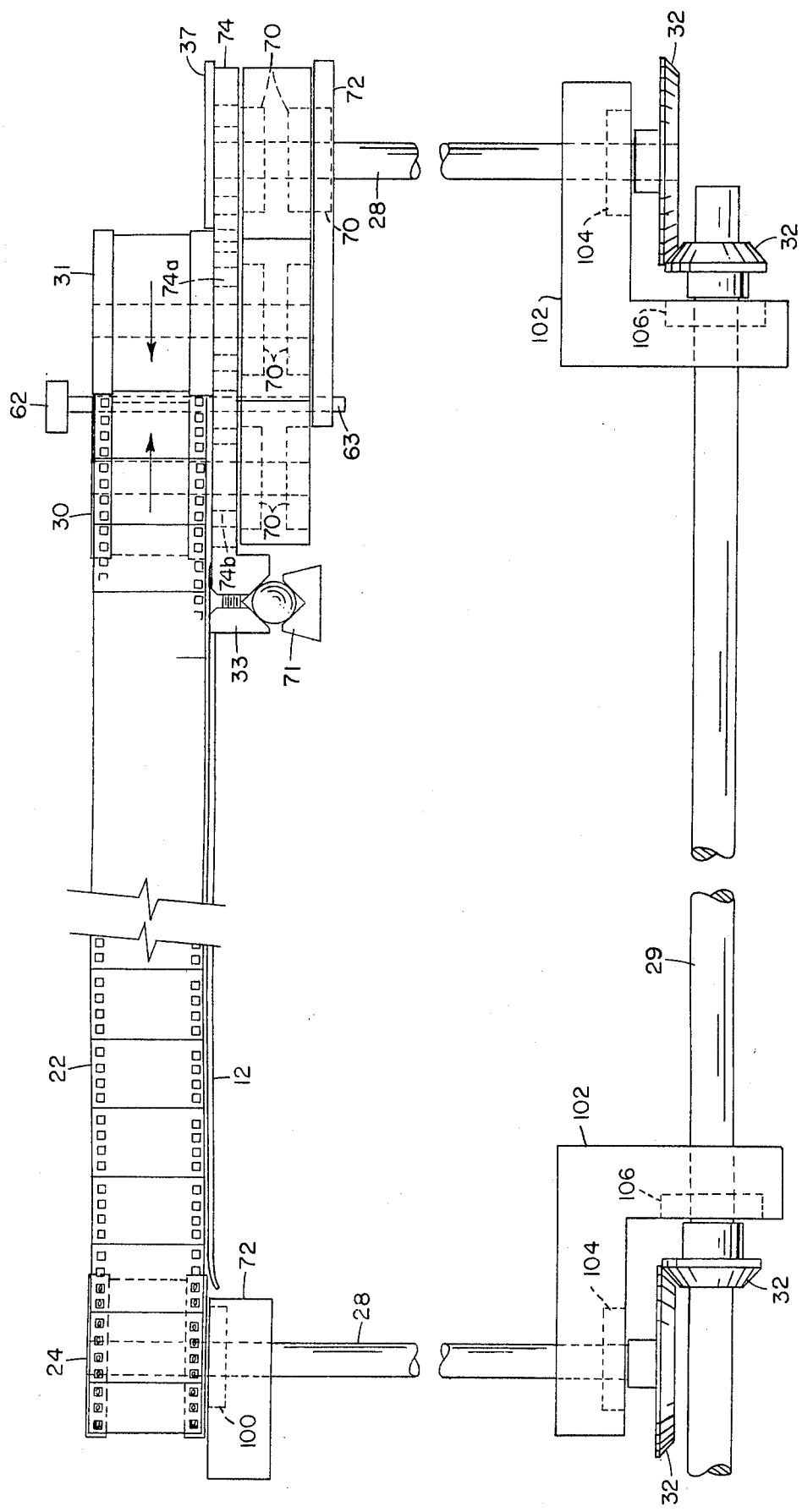
FIG. 10 is a partially cutaway view of the gearing of the invention apparatus.

The invention continuous loop film projector apparatus 10 is shown in FIG. 1. Platter 12 revolving in a counterclockwise direction is supported by frame 18. Frame 18 is shown as a bellows configuration although the invention is not restricted to this design. The upper walls 20 of the frame 18 expand and contract according to the air flow from a blower (not shown). Incoming film 22 from a projector engages sprocket 24, then is threaded around guide roller 25 and subsequently is wound on platter 12. Secured by conventional means to hub 19 of frame 18 are roller arms 14. Each roller arm 14 holds a set of four rollers 16, the rollers 16 guiding and holding film 22 in place as it is wound on platter 12. The film 22 retained on platter 12 is fed into a projector (not shown) by threading the film between feed sprockets 30 and idler 31, around guide rollers 26 and 27 and subsequently into the projector. By means of shaft 28 and bevel gears 32, sprocket 24 and gear 74 (as shown in FIG. 10) are rotated. Movement of sprocket 24 and gear 74 is accomplished by connecting the sprocket shaft 28 to a main shaft 29 that engages the motor operating the projector. This movement and cooperation between the film received by platter 12 and the dispensing of the film from platter 12 to a projector will be described further in FIG. 10.

Figure 2:
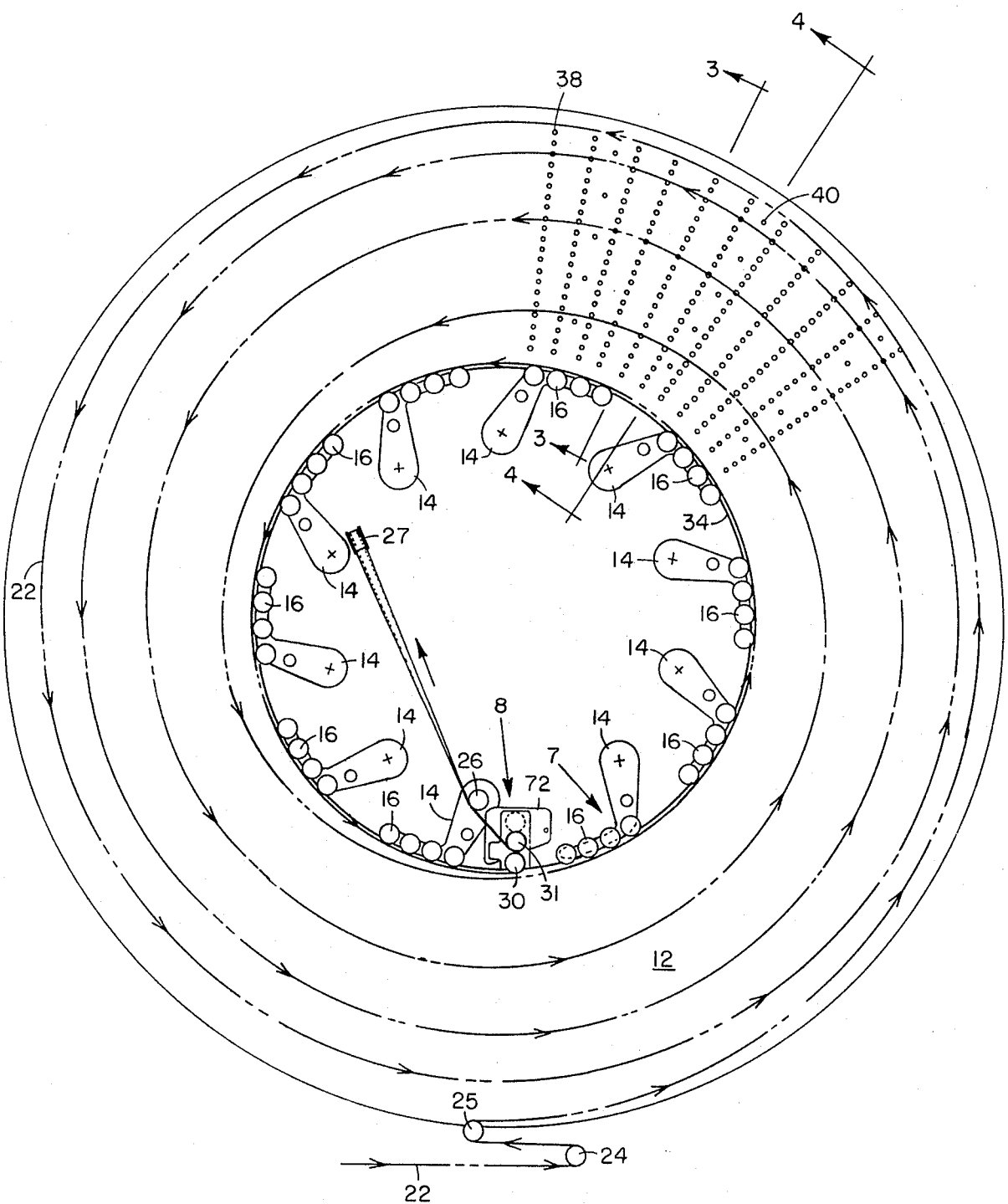
FIG. 2 is a top planar view of the platter of the invention apparatus having pneumatic means of lifting the film off the platter.

The top view of the invention apparatus is shown in FIG. 2. Platter 12 is shown revolving in a counterclockwise direction, the film 22 being taken up on sprocket 24, guided around guide roller 25 and eventually wound around the hub 34 of the platter 12. Around the inside perimeter of the platter 12 are located a series of roller arms 14. Attached to each roller arm is a group of rollers 16. These rollers 16 guide the film 22 around the hub 34. A more detailed description of roller arms 14 and attached rollers 16 will be given in the discussion of FIG. 7.

Also located on the inside perimeter of platter 12 is gear box 36 having a feed sprocket 30 and idler 31. Film 22 is threaded between feed sprocket 30 and idler 31. The film is subsequently fed into a projector after passing around guide rollers 26 and 27. Feed sprocket 30 is rotated by gear means (as will be further discussed below) while idler 31 rotates freely. Idler 31 functions to assist in guiding film 22 from feed sprocket 30 to guide rollers 26 and 27. Idler 31 may be omitted if no additional guide means is considered necessary in order to securely transfer film 22 from platter 12 to a projector (not shown). A more detailed description of gear box 36 and its attached sprockets and gears and function will be given in the description of FIG. 8.

The problem of friction between the edge of the film 22 and the surface of platter 12 as the film is being wound around hub 34 and on platter 12 is alleviated by means of a series of rows of holes 38 and 40. Rows of holes 38 running the width of platter 12 and very closely spaced together allow air forced up through platter 12 to flow at a 90 degree angle to the surface of platter 12. Intermittently spaced between a series of rows of holes 38 are slanted holes 40. These slanted holes 40 occur at regular intervals along the surface of the platter, yet are not as numerous as the holes 38. Air forced through slanted holes 40 lifts film 22 slightly off the platter 12 in a similar manner to air forced through holes 38. However, in addition to lifting film 22 off platter 12, air passed through slanted holes 40 also pushes film 22 inward toward the hub 34. There is no criticality in the angle of slanted holes 40 in platter 12, although it has been found that approximately a 30 degree angle with the air outlet angled toward the hub 34 is most beneficial.

Figure 3:
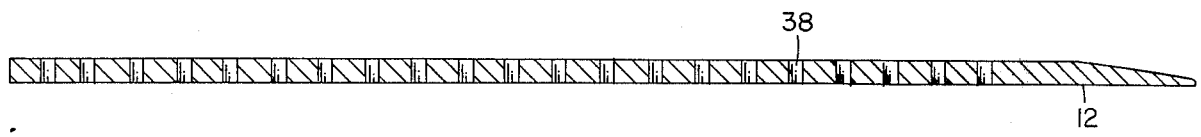
FIG. 3 is a sectional view of the platter in FIG. 2 taken along lines 3—3.
Figure 4:
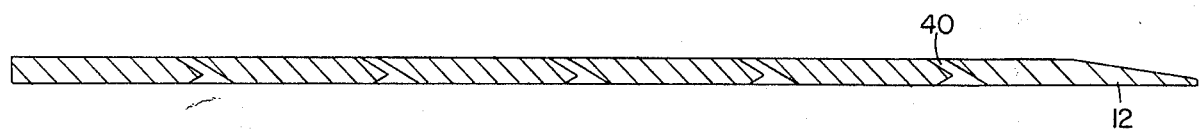
FIG. 4 is a sectional view of the platter in FIG. 2 taken along lines 4—4.

FIGS. 3 and 4 more fully illustrate the holes 38 and slanted holes 40 in platter 12 of FIG. 2. It can be seen from FIG. 3 that holes 38 are more clearly spaced together in contrast to slanted holes 40 in FIG. 4. The number of holes 38 across the width of the platter is not critical to the invention apparatus performing its function. Any number of holes 38 and slanted holes 40 may be used as long as there is enough air flow to lift film 22 off platter 12 a sufficient amount to reduce the friction on the edges of the film. It is this friction between the edges of film 22 and the surface of platter 12 that creates stretching and subsequently breakage and damage to the film. Both the holes 38 and the slanted holes 40 may be formed in the platter 12 by any number of methods, such as drilling or machining.

Figure 5:
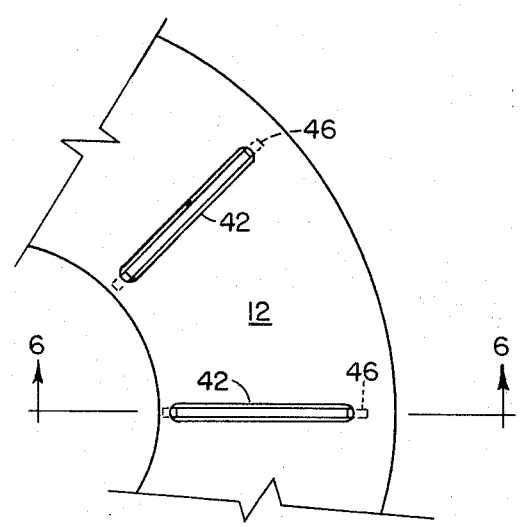
FIG. 5 is a top planar view of the platter of the invention apparatus showing mechanical means of lifting the film off the platter.

Forcing air through the platter 12 of the invention apparatus via holes 38 and slanted holes 40 as discussed above is the pneumatic method of the invention. The mechanical method of eliminating friction between the film 22 and the surface of platter 12 is accomplished by another design in the platter 12 as shown in FIG. 5. This top view of platter 12 shows a series of slots 42 extending the width of platter 12 and spaced around the entire platter 12 at regular intervals. Below these slots 42 and pivotally connected to the platter 12 are blades 46 having blade rollers 48 attached thereto. A more detailed view of these slots 42 and blades 46 and their method of operation in lifting film 22 slightly off the surface of platter 12 thereby reducing the friction of the film is more clearly shown in FIG. 6.

Figure 6:
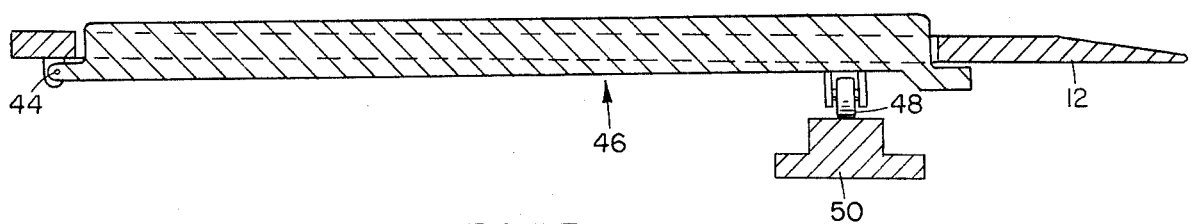
FIG. 6 is a sectional view of the platter in FIG. 5 taken along lines 6—6.

As illustrated in FIG. 6, attached to the underneath side of platter 12 by pivotal means 44 is blade 46. Connected to blade 46 by well-known conventional means is blade roller 48. Camming surfaces 50 spaced at regular intervals on frame 18 of the apparatus and directly under the platter 12 provide a means whereby blade 46 is lifted through slot 42 as a result of blade roller 48 contacting camming surface 50. As blade 46 is lifted through slot 42, it contacts the edge of film 22 and slightly lifts the film off the surface of the platter 12. Substantial friction between film 22 and the surface of the platter 12 is reduced by this slight and constant interval lifting of the film by means of blade 46.

Figure 7:
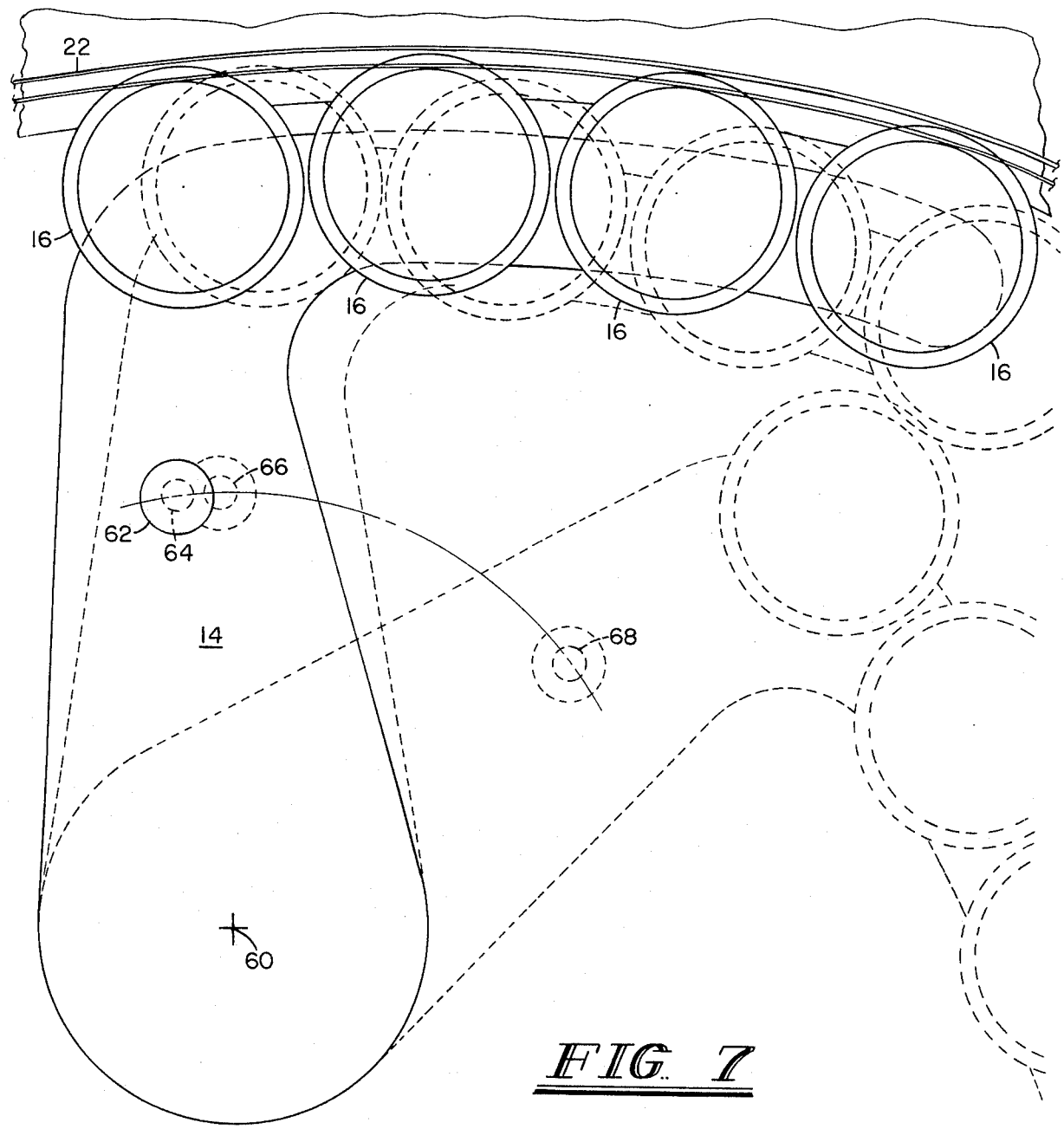
FIG. 7 is a top planar view of the rollers and roller arms on the platter of the invention apparatus.
Figure 9:
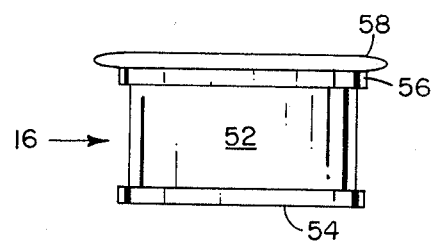
FIG. 9 is a side view of a typical roller of the invention apparatus.

FIG. 7 shows in detail the relationship between the roller arm 14 having rollers 16 attached thereto and the platter 12 and film 22. Film 22 is shown being guided and held on platter 12 by means of rollers 16. Rollers 16 are attached to L-shaped roller arm 14 by conventional means. The configuration of roller 16 is shown in more detail in FIG. 9. The roller 16 is shown having a cylindrical body 52 of predetermined height, a base 54, a top 56 and a cap 58. These rollers 16 are well known in the art. Therefore, no further discussion of their construction and composition is considered necessary. Also indicated in FIG. 7 are three positions for roller arm 14. Roller arm 14 rotates around pivot point 60 by lifting locking pin knob 62 until locking pin 63 (as shown in FIG. 10) no longer engages support plate 72. Roller arm 14 is thereby allowed to be rotated freely to either position 66 or 68. In the position as shown in FIG. 7, roller arm 14 and rollers 16 are in the overnight rest position. This is indicated by locking pin knob 62 resting in the position indicated by dotted line 64. Lifting locking pin knob 62 thereby allowing roller arm 14 to be rotated to the position indicated at 66 places the roller arm 14 and roller 16 in the projecting position. From this position 66, film 22 is fed from platter 12 and passed through a projector. Lifting locking pin knob 62 and rotating arm 14 and roller 16 to the position indicated at 68 places the roller arm in a shipping position. In this shipping position 68, film 22 is removed from platter 12 and taken up on a reel used for transporting the film from one theater to another. With all of the rollers 16 contacting the film 22 as shown in FIG. 7, the overnight rest position is maintained. In this position 64, the film is held in correct relationship and allowed to cool and be prepared for the next day's operations. In the projecting position, when roller arm 14 is at position 66, film 22 is in the position to be fed into a projector. When in the shipping position indicated at 68, roller arm 14 and roller 16 are completely disengaged with the film 22 thus allowing the film to be prepared for shipping or makeup.

Figure 8:
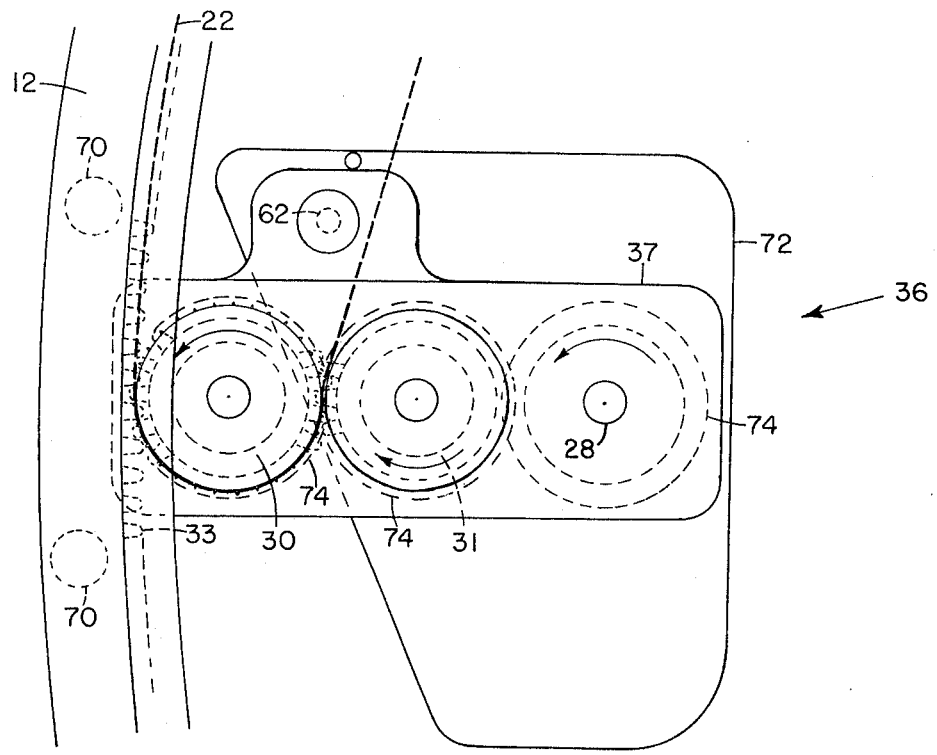
FIG. 8 is a top planar view of the gear box of the invention apparatus.

The mechanism for receiving film 22 and feeding the film into a projector is shown in FIG. 8. Gear box 36 comprises feed sprocket 30, idler 31 and gears 74, 74a and 74b. Feed sprocket 30 and idler 31 are located above cover plate 37, while gears 74, 74a and 74b are positioned between cover plate 37 and support plate 72. Gear 74 is powered by the projector motor via cooperative engagement between gear shaft 28, bevel gears 32 and main shaft 29 as will be discussed later in relation to FIG. 10. Gears 74 and 74a mesh together and drive gear 74b in a manner well known in the mechanical arts to enable gear 74b to rotate feed sprocket 30. By gear 74b meshing with platter ring gear 33, platter 12 revolves at the same speed as feed sprocket 30 thereby permitting film 22 to be fed off platter 12 and into a projector (not shown) at a constant rate of speed. Locking pin knob 62 enables the gear box 36 to be pivoted into the position for shipping the film indicated by circle 68. [see FIG. 7] At this position 68, feed sprocket 30 is completely disengaged from film 22 on platter 12. The position of gear box 36 shown in FIG. 8 is for projecting the film 22. Gear box 36 is attached to a support plate 72 which is secured to the invention apparatus by known means. Ball bearings 70 supported by any conventional means under platter 12 allow platter 12 to rotate freely. The cooperation of feed sprocket 30, idler 31, and gears 74, 74a and 74b in gear box 36 will be discussed further in the description of FIG. 10.

FIG. 10 shows a cutaway view of the mechanism whereby film 22 is fed from the platter 12 to a projector (not shown). Film 22 from a projector is received by film sprocket 24. The film sprocket 24 is supported by support plate 72 and rotated by means of sprocket shaft 28 held in position by a conventional bearing 100 to permit rotation of shaft 28 therethrough. Sprocket shaft 28 having bevel gears 32 engages main shaft 29 also having bevel gears 32, each of the bevel gears of the respective shafts meshing with each other to provide means of rotation. The respective shafts 28 and 29 are held in position by support brackets 102 with conventional bearings 104 and 106 allowing rotation of the respective shafts 28 and 29 therethrough. At the opposite end of main shaft 29 and engaged thereto by means of bevel gears 32 is a second sprocket shaft 28. This second sprocket shaft 28 projects through support plate 72 and engages gear 74 supported on bearings 70, all part of previously discussed gear box 36. Gear 74 rotating in the direction indicated meshes with gear 74a which in turn meshes with gear 74b to rotate feed sprocket 30 in the direction indicated. All gears 74, 74a and 74b are supported on bearings 70 on support plate 72.

Secured to frame 18 (not shown) by conventional means is support bearing 71. This support bearing 71 supports platter ring gear 33 located at the inner edge of platter 12. Platter ring gear 33 meshes with gear 74b rotating feed sprocket 30 thus enabling platter 12 to rotate at the same speed as rotating feed sprocket 30. By platter 12 and feed sprocket 30 rotating at the same speed, film 22 is efficiently and securely fed from platter 12 around feed sprocket 30 to the projector (not shown). Locking pin 63 allows gear box 36 upon lifting locking pin knob 62 to be pivoted to disengage feed sprocket 30 and gear 74b from platter 12 and platter ring gear 33 and permit film 22 to be shipped. This is clearly shown in FIG. 7 wherein the locking pin knob 62 can be moved to the position shown in broken lines. The locking pin knob 62 is received in holes (not shown) in the support plate 72, which thereby secures the locking pin knob 62 in position. (See FIG. 10.)

One of the unique features of the invention apparatus is the synchronous movement of sprocket 24 receiving film 22 from a projector and feed sprocket 30 feeding film 22 into a projector. Synchronous movement is accomplished by main shaft 29 engaging the power generating means of the projector (not shown) by means of a flexible shaft. By joining sprocket 24 and feed sprocket 30 together via sprocket shaft 28 and main shaft 29 and then subsequently connecting main shaft 29 to the power generating means of a projector, the film 22 is received on platter 12 and delivered from platter 12 at the same speed. Having this one power generating source and all of the mechanism for feeding film 22 onto platter 12 and off of platter 12 permits film 22 to travel at a uniform rate of speed with minimal or no stress on the film. In previous film projecting apparatus, the incoming film and the outgoing film travelled at two different rates of speed and in doing so, the film at times was drawn taunt and at other times allowed to go slack thereby creating stress and friction on the film. This friction and stress on the film are the main contributors to breakage and damage of the film.

Figure 11:
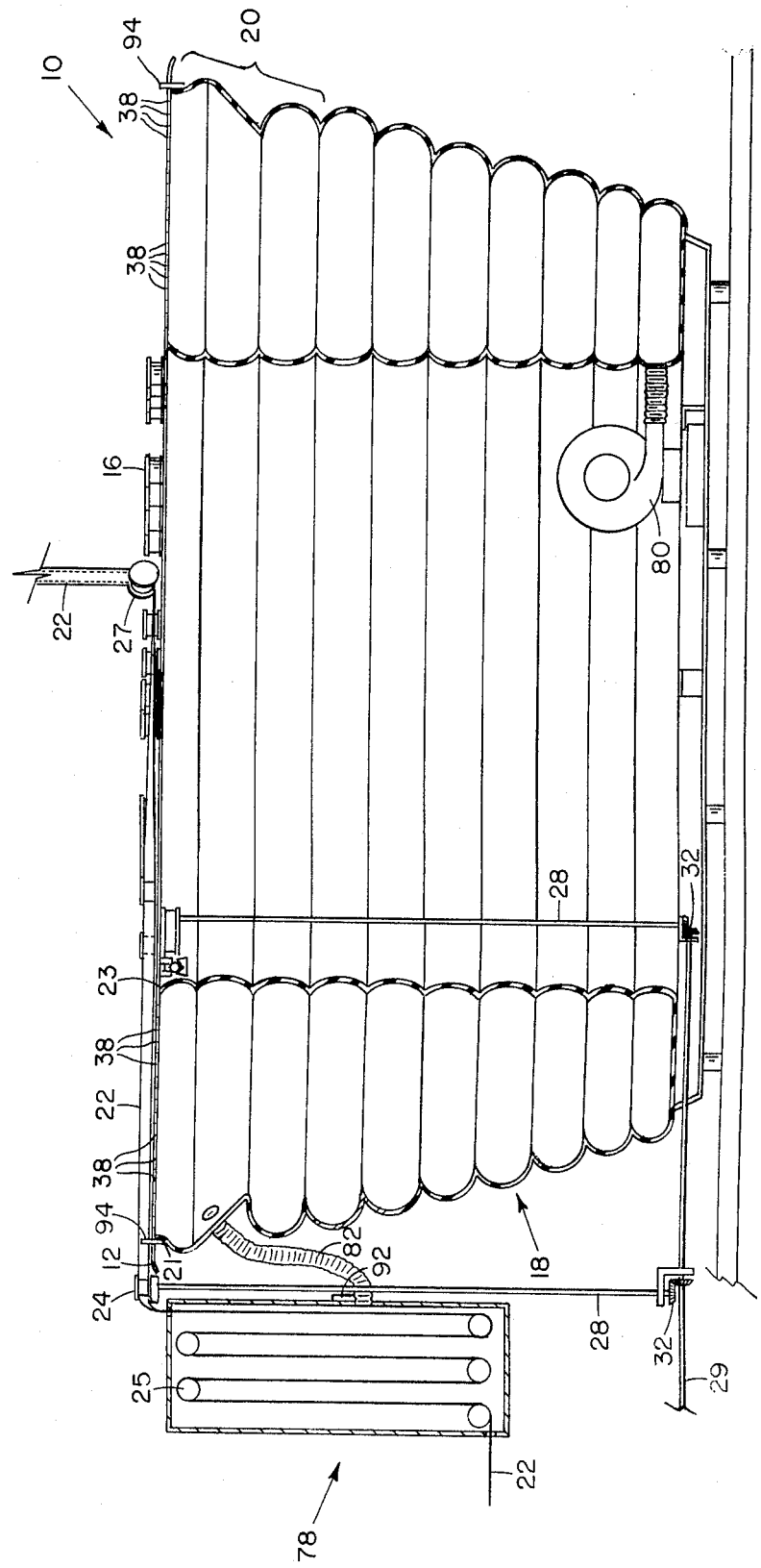
FIG. 11 is a cutaway side view of the invention apparatus showing the cooler, bellows, and air blower.

An embodiment of the invention apparatus utilizing pneumatic means to decrease the friction on film received on a platter is shown in FIG. 11. Film 22 is received in a cooler or heat exchanger 78 and is guided over a series of guide rollers 25. While being guided over these rollers, the film 22 is allowed to cool and heat built up on the film as a result of being run through a projector is allowed to dissipate. The film 22 is received on sprocket 24 and wound around hub 34 on platter 12, assisted and guided by means of roller 16 attached to roller arms 14 (not seen). When desired, film 22 is fed into a projector by feed sprocket 30 as described in the description of FIGS. 2 and 10. As previously discussed and shown, sprocket shaft 28 engages main shaft 29 by means of bevel gears 32, main shaft 29 eventually connecting to the power generating source of a projector. A blower 80 positioned at the bottom of the invention apparatus is connected to the bellows-like frame 18 of the apparatus 10. As previously discussed, walls 20 near the upper part of frame 18 underneath and adjacent platter 12 act like a bellows when air from blower 80 is forced through the apparatus 10. To achieve the most efficient use of the air passed through the invention apparatus, seals 21 and 23 attached to the outer edge of wall 20 contact the bottom of platter 12. These seals can be any type of material, such as rubber and plastic, that will permit the platter 12 to revolve yet prevent air from leaking around the platter. Inner seal 23 is fixedly held against the bottom of platter 12. Outer seal 21 is movable to adjust the number of holes 38 and slanted holes 40 receiving air from blower 80. As discussed previously, the platter 12 can accommodate films having lengths varying from about 7,000 feet to about 40,000 feet. The number of holes supplying air to the film to reduce the friction thereon must be commensurate with the length of the film to be held by the platter. Hence seal 21 may be adjusted to correlate the number of holes receiving air to the length of the film. Seal 21 may be held in position by any number of means, such as simple tab or pin 94. The tab or pin 94 may be a series of tabs encircling the platter 12 and received in the holes 38 (see FIG. 2) located an equal distance from the center of platter 12. The seal 21 is a sliding type seal with the platter 12. A flexible hose 82 joins the upper portion of frame 18 at the wall portion 20 of the bellows to the cooler or heat exchanger 78. This flexible hose 82 allows air blown through frame 18 to pass into cooler 78 and thereby cool the incoming film 22. Connected to cooler or heat exchanger 78 near the entrance of hose 82 is a microswitch 92, such as a flag switch. Microswitch 92 is electrically connected to the motor of a projector by conventional means that need not be discussed in detail. As long as air is blown through hose 82 (and thereby through the invention apparatus), microswitch 92 will complete an electrical circuit and allow the projector (not shown) to continue operating. If air ceases to be forced from blower 80, microswitch 92 breaks the circuit and thereby prohibits the projector from receiving power. Hence, microswitch 92 functions as a safety for the invention apparatus by shutting off the projector when the blower 80 fails to force sufficient air through hose 82 to permit microswitch 92 to complete an electrical circuit. This sensing system insures that the projector and blower will not run when film is not passing through cooler or heat exchanger 78. Although a microswitch has been discussed, any means of insuring that the projector does not operate if the blower 80 is not functioning may be utilized.

Figure 12:
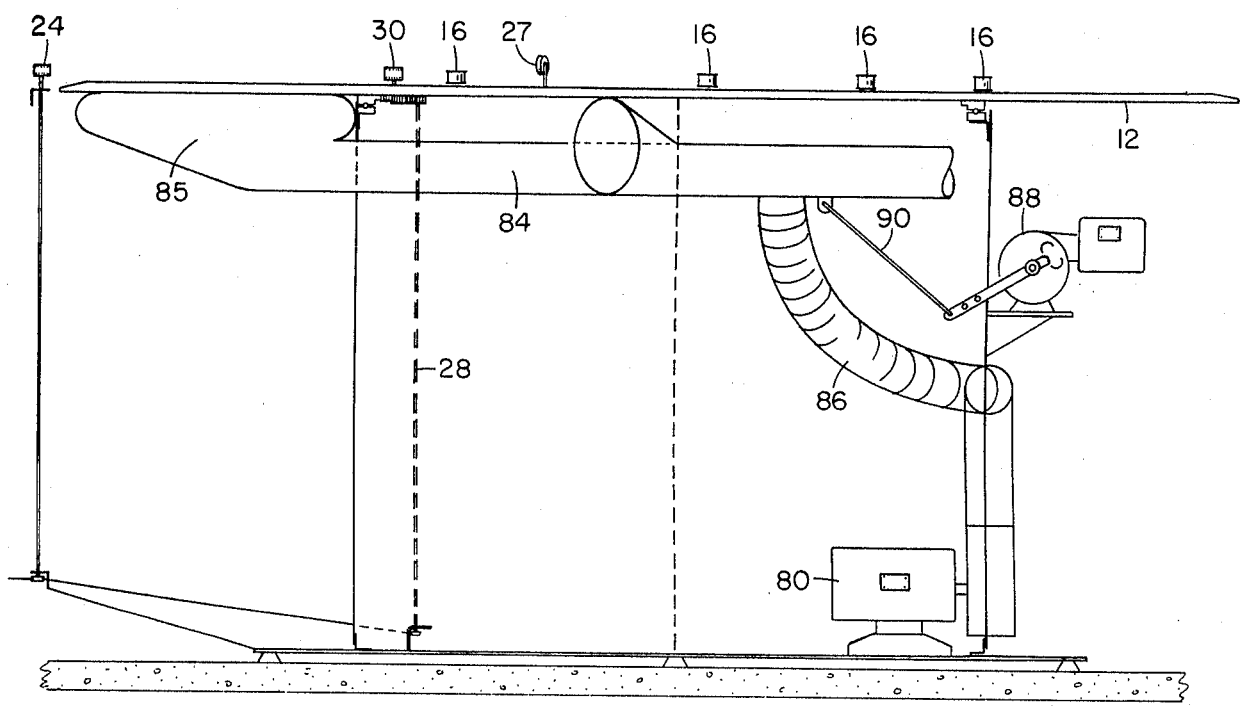
FIG. 12 is a cutaway side view of the invention apparatus showing a manifold means to force air through holes in the platter.

An alternative pneumatic means of reducing the friction on film 22 coming into platter 12 and subsequently being fed into a projector is shown in FIG. 12. A manifold 84 engaging the underneath side of platter 12 is connected to a blower 80 by means of a flexible conduit 86. Manifold 84 is reciprocated by arm 90 having one end attached to manifold 84 and an opposite end attached to motor 88. In lieu of the holes as described in the previous Figures as a means of passing air from the blower 80 through the platter 12 and thereby reducing the friction on film 22, jets (not shown) extending the width of the platter 12 are provided as a means of passing the air. Each channel 85 of manifold 84 fits underneath each jet in the platter 12 in a tight fit maintained by seals similar to those as described above in FIG. 11. The length of the jets in the platter 12 are adjusted by expanding or reducing the mouth of channel 85. This may be accomplished by any of a number of methods, such as a band of flexible material connected to the top of the manifold, the band having adjustable positions to increase or decrease the opening of the channel 85. Actuation of arm 90 by motor 88 reciprocates manifold 84. Channels 85 of manifold 84 then oscillate thereby varying the volume of air forced through the jets.

The invention continuous loop film projecting apparatus 10 as described above provides a means whereby friction built up on film 22 as the film rubs against the surface of a platter 12 may be decreased or, in some cases, totally eliminated. By decreasing or eliminating this friction, breakage and damage to the film is greatly reduced. To accomplish this problem of reducing the friction on film, applicant has provided an apparatus wherein pneumatic or mechanical means is utilized. In the pneumatic means, air is forced through a platter 12 having a series of holes 38 or jets, the forced air lifting the film 22 off the surface of the platter 12 and thereby reducing the friction on the film. In the mechanical means, blades 46 pivotally hinged on the underneath sides of slots 42 in a platter 12 project through the slots 42 in the platter 12 as blade rollers 48 secured to the blades 46 contact a camming surface 50. The projected blades 46 then lift film resting on the platter 12 thereby reducing or eliminating the friction on the film 22. Whether utilizing the pneumatic means or the mechanical means of reducing the friction on the film, the same means of feeding the film to and from a projector is used. Film comes into a cooler 78 from a projector, is guided over a series of rollers and onto a sprocket. The film is then wound around a hub of a platter having air holes 38 or jets and held in position until a predetermined time by a series of rollers 16 secured to roller arms 14. The film 22 is fed away from the platter by means of a feed sprocket 30 into a projector. The film is then projected for viewing. Upon completion of projection of the film, the continuous loop of film is then transported back into the cooler 78 and around guide rollers 25 where it is cooled, and subsequently fed back onto film sprocket 24. The process is then repeated. The film travels from the cooler 78 onto the platter 22 and then into the projector at the same rate as the film travels from the projector back into the cooler. This synchronous rate of travel is accomplished by connecting the sprocket 24 receiving the film from the cooler 78 and the feed sprocket 30 feeding the film to the projector to a common main shaft 29 that is subsequently connected to the projector power generating means. A pivotally actuated arm 14 having rollers 16 attached thereto allows the film 22 retained on the platter 12 to be either projected, or prepared for shipping or remain at overnight rest. For shipping and receiving film 22, arms 14 are pivoted to disengage rollers 16 from film 22 and a removable hub is inserted. All of these various functions act cooperatively to produce the continuous film projecting apparatus 10 as disclosed.

As an optional feature of the invention apparatus, an auxiliary motor may be utilized to power the platter 12 when a newly received film is first wound onto platter 12 prior to the film being projected. Film from shipping reels is wound onto platter 12 prior to the film being projected. This "make up" time is substantially reduced if an auxiliary motor operating at a higher speed than the projector motor is used. The projector motor can also be used suitably for this "make up" procedure with just increased make up time.

The construction and operation of the device of this invention has been described in detail. What is desired to be claimed is all modifications and adaptations of this invention and not departing from the scope of equivalents as defined in the appended claims.

I claim:

1. A continuous loop film projecting apparatus comprising:
    a frame;
    a revolving platter supported on said frame, said platter having a large outer diameter and a smaller inner diameter;
    film friction reducing means cooperating with said platter, said means reducing friction between film received on said revolving platter and a receiving surface of said revolving platter, said film friction reducing means comprising:
        a series of air outlets in said platter; said outlets being holes arranged in a pattern of rows of closely spaced holes intermixed with rows of widely spaced slanted holes, a blower mounted on said frame; and
        means to convey air from said blower to and through said air outlets in said platter;
    seal means on said air conveying means, said seal means contacting the underside of said platter;

guide means mounted on said frame adjacent said platter inner and outer diameters, said guide means maintaining film received on said platter as said platter revolves in a configuration to subsequently be projected;

feeding means mounted on said frame adjacent said platter inner diameter, said feeding means receiving film from said platter and dispensing said film to a projector; and means for driving said platter, said guide means and said feeding means.

2. The apparatus of claim 1 wherein said air conveying means are bellows.

3. The apparatus of claim 1 wherein said air outlets are jets.

4. The apparatus of claim 1 wherein said guide means for said film received on said platter comprises a series of adjustable arms having secured thereon a group of rollers, said rollers guiding and supporting film received on said platter.

5. The apparatus of claim 1 having a heat exchanger secured to said frame, said heat exchanger comprising a series of off-set rollers capable of receiving projected film and allowing said projected film to cool prior to dispersing said projected film to said platter.

6. The apparatus of claim 1 wherein said feeding means comprises a gear box having mounted therein a feed sprocket and gears, said gears cooperating to drive said feed sprocket and allow said feed sprocket to feed film from said platter to a projector whereby said film is to be projected.

7. The apparatus of claim 6 wherein a sprocket is secured to said frame adjacent the outer diameter of said platter, said sprocket receiving film from a projector and transferring same to said platter.

8. The apparatus of claim 7 wherein said sprocket and said feed sprocket are connected to a projector via a main shaft and said sprocket and said feed sprocket operate at the same speed as said projector.

9. A continuous loop film projecting apparatus comprising:

a frame;

a revolving platter supported on said frame, said platter having a large outer diameter and a smaller inner diameter;

film friction reducing means cooperating with said platter, said means reducing friction between film received on said revolving platter and the receiving surface of said revolving platter, said film friction reducing means comprising: a series of slots extending the width of said platter;

a series of blades pivotally connected to the underside of said platter directly below said slots, said blades having secured on and end opposite said pivotal connection a blade roller; and at least one camming surface attached to said frame, said camming surface positioned so as to make contact with said blade rollers on said blades;

guide means mounted on said frame adjacent said platter inner and outer diameters, said guide means maintaining film received on said platter as said platter revolves in a configuration to subsequently be projected;

feeding means mounted on said frame adjacent said platter inner diameter, said feeding means receiving film from said platter and dispensing said film to a projector; and means for driving said platter, said guide means and said feeding means.

* * * * *